United States Patent
Karlsson

(10) Patent No.: US 6,230,659 B1
(45) Date of Patent: May 15, 2001

(54) GROOMING DEVICE AND METHOD OF USING

(76) Inventor: Haraldur Karlsson, 2723 Meandering Trail, Kingwood, TX (US) 77339

( * ) Notice: Subject to any disclaimer, the term of this patent is extended or adjusted under 35 U.S.C. 154(b) by 0 days.

(21) Appl. No.: 09/236,982

(22) Filed: Jan. 26, 1999

(51) Int. Cl.$^7$ .................................................. A01K 13/00
(52) U.S. Cl. ............................ 119/601; 119/625; 119/628
(58) Field of Search .................................. 119/601, 613, 119/625, 628, 632, 633, 611, 612; 132/107, 126, 143, 148

(56) References Cited

U.S. PATENT DOCUMENTS

| | | | |
|---|---|---|---|
| 309,668 | * 12/1884 | Weightman | 119/613 |
| 1,031,999 | * 7/1912 | Gronlund | 119/628 |
| 1,135,645 | * 4/1915 | Woodall | 119/612 |
| 3,792,707 | 2/1974 | Tupper | 132/150 |
| 3,927,684 | 12/1975 | Lam | 132/11 |
| 3,981,275 | 9/1976 | Schimoler | 119/83 |
| 3,999,295 | 12/1976 | Du Bois | 30/195 |
| 4,009,725 | 3/1977 | Stuart | 132/11 |
| 4,018,238 | * 4/1977 | Ishida | 132/143 |
| 4,277,193 | 7/1981 | Knaus | 401/39 |
| 4,517,703 | * 5/1985 | Koke | 119/628 |
| 4,521,962 | 6/1985 | Van Natta | 30/34.1 |
| 4,729,147 | 3/1988 | Armbruster | 15/314 |
| 4,799,457 | 1/1989 | Gordon | 119/92 |
| 4,815,232 | 3/1989 | Rawski | 43/136 |
| 4,913,172 | 4/1990 | Chou | 132/118 |
| 4,947,799 | 8/1990 | Parker | 119/83 |
| 4,970,990 | 11/1990 | Wilhelmi | 119/86 |
| 5,067,444 | 11/1991 | Parker | 119/85 |
| 5,074,006 | 12/1991 | Eremita | 15/344 |
| 5,168,833 | 12/1992 | Spears | 119/85 |
| 5,267,528 | * 12/1993 | Murieen, Sr. | 119/628 |
| 5,318,051 | * 6/1994 | Koppel | 132/126 |
| 5,435,327 | 7/1995 | Ho | 132/118 |
| 5,519,912 | * 5/1996 | Kawamura | 119/628 |
| 5,655,482 | * 8/1997 | Lundquist | 119/625 |

* cited by examiner

Primary Examiner—Charles T. Jordan
Assistant Examiner—Elizabeth Shaw
(74) Attorney, Agent, or Firm—Madan, Mossman & Sriram, P.C.

(57) ABSTRACT

The present invention provides an apparatus and method for grooming fur-bearing animals with a body having an integral base with a leading edge having a plurality of spaced apart tines attached and at least one sleeve proximate to the base contacting a portion of at least one of the plurality of tines.

13 Claims, 4 Drawing Sheets

GROOMING DEVICE AND METHOD OF USING

BACKGROUND OF THE INVENTION

1. Field of the Invention

This invention relates generally to a grooming device for use on fur-bearing animals and more particularly to a grooming device for use on pets so that hair and other debris may be removed and retained by the grooming device.

2. Background of the Art

A variety of grooming devices, generally in the form of combs and brushes, have been utilized for cleaning fur-bearing animals. Typically, to groom dogs or cats, a toothed metal or plastic comb is used for cleaning, tidying, straightening and partially removing excess and dead hair. However, these commercially available grooming devices have not proven successful in solving the grooming problems related to the partial nature of the removal of the animal's loose and dead hair. Hair removed by these devices typically escapes from the tines of the device, falling to the furniture and floor and creating a generally unpleasant house cleaning experience. Additionally these devices are not capable of removing large amounts of hair, particulary when the animal is shedding, as the drag between the hairs on the animal is greater than the drag between the grooming device and the hair. Consequently, loose hair remains in the animal's fur.

Some grooming devices, specifically designed for animals losing or shedding their winter coats in spring, may be from a strip of sheet metal. Edges of the commercially available devices may be machined or die cut with a series of teeth by which is hair stripped or cut from the animal's fur. The irregular teeth of these grooming devices are ragged and have rough edges. As a consequence, these grooming devices not only loosen and remove some of the animal's hair but they also cut the animal's skin and remove living hairs.

Grooming devices have also been fitted with vacuums and adhesives in order to facilitate the removal of loose hair while attempting to minimize the cleanup. These grooming devices have proven to either frighten the animal with their noise or pull living hair from the animal's skin. These experiences tend to prolong the grooming operation. Additionally, these grooming devices are relatively costly and cumbersome.

Pet owners and grooms prefer a grooming device that does not cut the animal's skin, does not need electricity, does not frighten the animal, does not require messy adhesives and does not make a mess of the house and the furniture. The apparatus of the present invention provides pet owners and grooms with a grooming device which efficiently removes dead hair without cutting or frightening the animal while retaining a large amount of the dead hair on the grooming device and obviating or facilitating the cleanup.

SUMMARY OF THE INVENTION

In accordance with the invention, the foregoing advantages have been achieved through the present grooming device for use on a fur-bearing animal. The grooming device may include a body having an integral base with a leading edge having a plurality of space apart tines attached. The plurality of spaced apart tines are preferably substantially parallel tines in which the spacing of the tines allows the passage of the fur or animal's hair. The grooming device also has at least one sleeve proximate to the base such that the sleeve contacts a portion of at least one of the plurality of tines.

The present invention may also include a sleeve having a leading edge, a trailing edge, two side edges, and an inner and outer surface. Optionally, a partial sleeve may be utilized. The inner surface of the sleeve is preferably in fitted contact with at least one tine. More preferably the sleeve may be in fitted contact with a plurality of tines.

Another feature of the present invention may include a sleeve through which at least one tine may be inserted. In this particular embodiment the sleeve acts as an open cap or casing through which one or multiple tines may be inserted in a glove configuration, or preferably, in a mitten configuration. Optionally, the sleeve may contact only a portion of a single tine. A further feature of the present invention is that the sleeve may be in hinged fitted contact at one or both extreme ends of the tines.

The present invention may include multiple sleeves to provide the desired coverage of the combing area. A further feature in accordance with this aspect of the present invention may include sleeves with a plurality of bristles. The stiffness of the bristles and any overlap of the bristles with adjoining sleeves' bristles may be adapted for the type of fur or shedding pattern of the animal, e.g., softer, overlapping bristles for shorter hair or stiffer bristles with a gap for longer hair or shedding.

Another feature of the present invention may use a sleeve that has a naturally textured surface such as elastomeric materials like natural or synthetic rubbers and plastics. Other naturally textured materials such as leathers or fabrics with naps may be used as the sleeve. An additional feature of the present invention would be to use hard materials having a dry coefficient of friction from about 0.5 to about 1.0. Preferably, the textured materials have a dry coefficient of friction from about 0.6 to about 0.9, more preferably from about 0.7 to about 0.8.

In accordance with another aspect of the present invention, the foregoing advantages may be achieved by varying the amount of combing surface area covered by the sleeve or multiple sleeves. Broadly, the grooming device may include using a sleeve or multiple sleeves to cover about 5% to about 75% of the combing surface area. Preferably, at least one sleeve or multiple sleeves cover about 20% to about 65% of the combing surface area. More preferably, the at least one sleeve or multiple sleeves cover about 30% to about 50% of the combing surface area.

In accordance with another aspect of the present invention, the grooming device may include a sleeve which is in planar alignment with the tines. Still, another feature of this aspect of the present invention is a grooming device with a sleeve woven between the tines. A further feature of this aspect of the present invention may include the use of multiple sleeves in either planar alignment, woven serpentine between the tines, a basket weaving pattern, or a random weaving pattern.

In accordance with another aspect of the present invention, the sleeve or sleeves may be made of an elastomeric coating. One embodiment of the inventive grooming device includes a body having an integral base with a leading edge, the leading edge having a plurality of space apart tines attached thereon and an elastomeric coating. The coating preferably covers at least about 5% of the combing surface area.

In accordance with another aspect of the present invention, a method of grooming a fur-bearing animal may include the steps of: guiding a body having an integral base with a leading edge having a plurality of spaced apart tines attached thereon through the animal's hair; stroking the animal's hair; removing hair from the fur-bearing animal and retaining at least some of the hair removed from the animal at the leading edge of the sleeve. The method may include the additional steps of gently lifting the grooming device and rolling it outward, away from the animal's skin. The rolling motion generally promotes longer contact of the leading edge of the sleeve or sleeves with the animal's hair. Thus, more hair may be removed and retained in each stroke.

Still, another aspect of the present invention of grooming a fur-bearing animal may include the steps of: guiding a body having an integral base with a leading edge having a plurality of spaced apart tines attached thereon through the animal's hair; stroking the animal's hair; removing hair from the fur-bearing animal and retaining at least some of the hair removed from the animal at the leading edge of the coating. The method may also include the additional steps of gently lifting the grooming device and rolling it outward, away from the animal's skin. The rolling motion generally promotes longer contact of the leading edge of the coating with the animal's hair. Thus, the grooming device removes and retains more hair with each stroke through the animal's hair.

BRIEF DESCRIPTION OF THE DRAWINGS

For detailed understanding of the present invention, reference should be made to the following detailed description of the preferred embodiment, taken in conjunction with the accompanying drawings, in which like elements have been given like numerals, and wherein.

DETAILED DESCRIPTION OF THE PREFERRED EMBODIMENTS

Figure 1A:
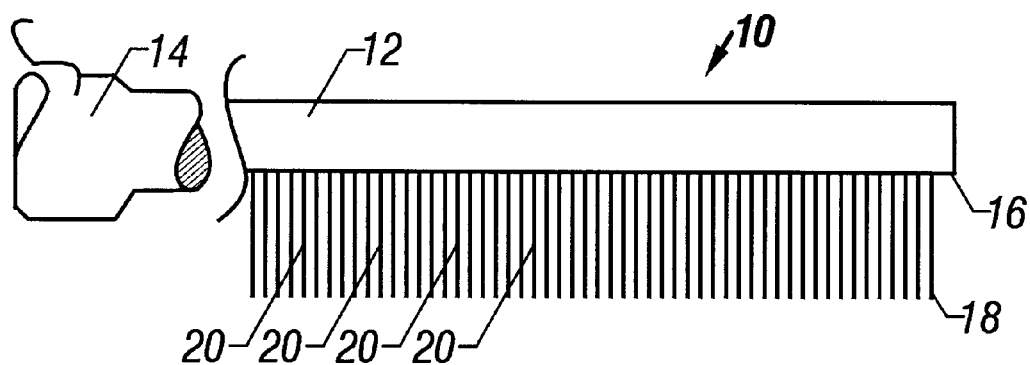
FIGS. 1a–1c are schematic illustrations of commercially available grooming devices.
Figure 1B:
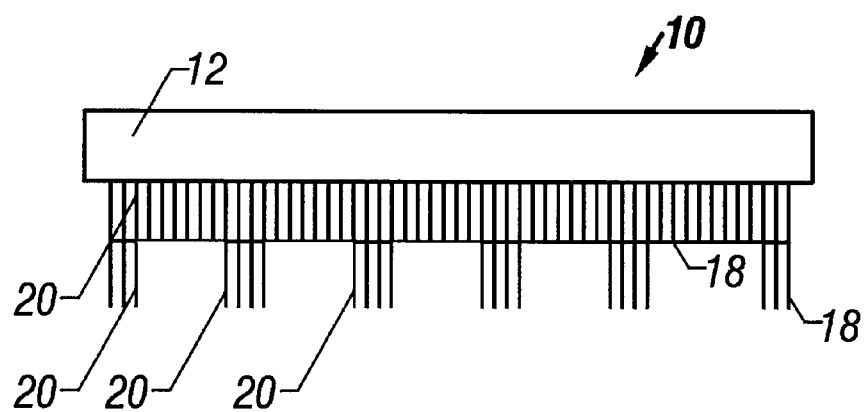
Figure 1C:
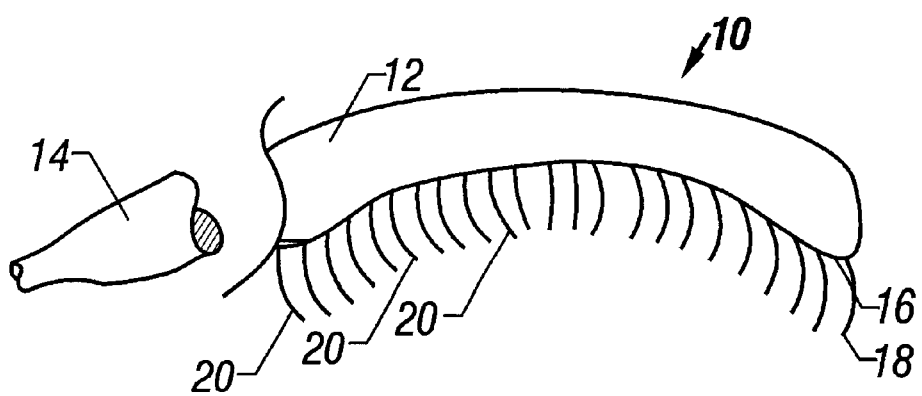

FIGS. 1a–1c show three grooming devices available in the dog and cat grooming business. Theses and other tined or toothed combs may be made of metal or plastic and are used for cleaning, tidying, straightening, and removing the hair of fur-bearing animals. The tines 20 are generally spaced apart. The tines 20 may be of the same length as seen in FIG. 1a. The tines 20 may also be of varying lengths and form various patterns such as standing waves, v-notches or square waves as seen is FIG. 1b. The tines 20 may be straight as seen in FIGS. 1a and 1b or curved as seen in FIG. 1c. The base 12 of the grooming devices may be a polygon figure such as the rectangular shape as seen in FIGS. 1a and 1b or of an irregular free form shape as seen in FIG. 1c. Other commercial available grooming devices may have flexible bases that change shape in response to the animals' body shape and force applied in stroking the grooming device through the animals fur (not shown).

As previously discussed, there are many disadvantages with the commercially available grooming devices as seen in FIGS. 1a–1c and with others such as those described above, particularly those with cutting edges (not shown).

Figure 2:
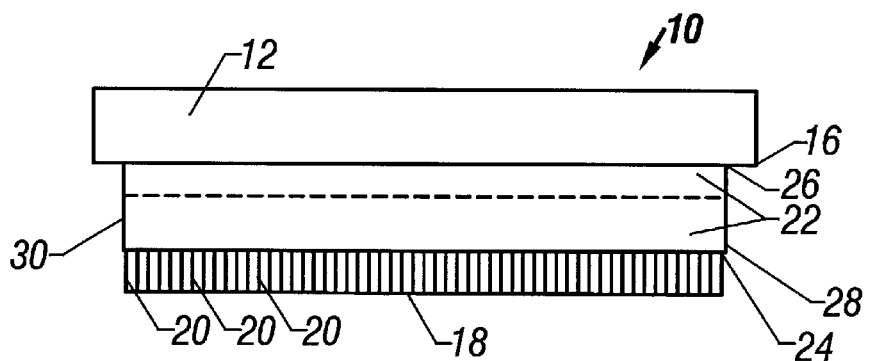
FIG. 2 is a schematic illustration of a grooming device of the present invention.

With reference to FIG. 2, a sleeve 22 of the present invention may be used with any of these conventional grooming devices to improve the removal of dead hair from fur-bearing animals while increasing the retention of the hair on the grooming device, facilitating the cleanup. The sleeve 22 should have a leading edge 24, a trailing edge 26, two side edges 28, 30 and an inner surface 32 and an outer surface 34. The trailing edge 26 of the sleeve 22 is preferably proximate to the leading edge 16 of the base 12 of the body 10 of the grooming device. A plurality of spaced apart tines 20 are substantially parallel and spaced to allow the passage of the fur or animal's hair. Preferably, the spacing is varied depending on the coarseness, thickness, and length of hair of the animal. Preferably an optional handle may be provided 14. More preferably, the handle may be a rat-tail style which may be used to facilitate guiding of the grooming device.

Figure 2A:
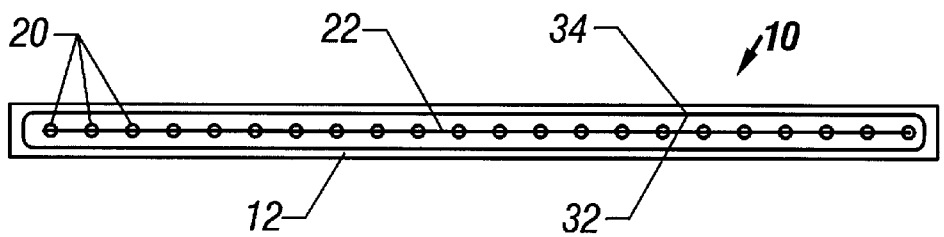
FIG. 2a is a schematic illustration of a bottom view of a grooming device of the present invention.
Figure 3:
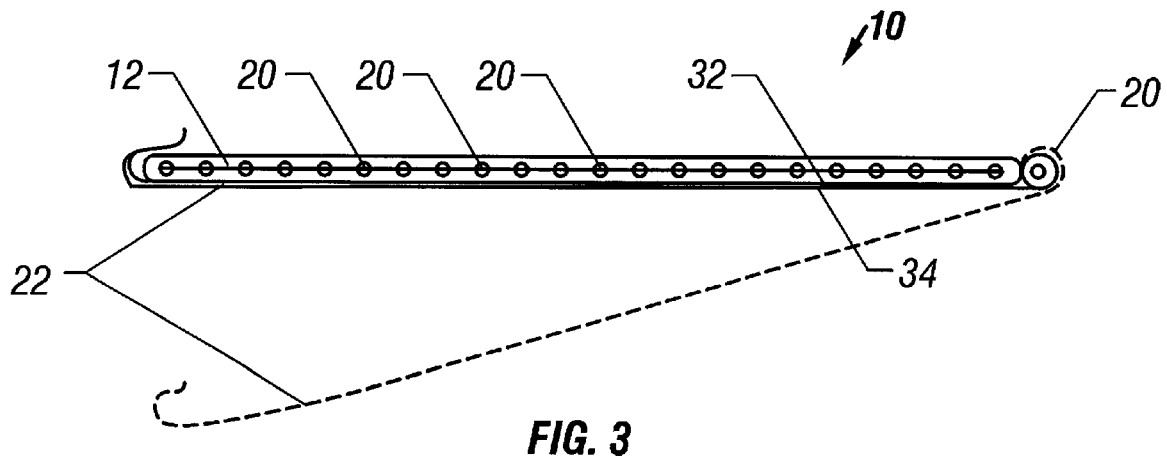
FIG. 3 is a schematic illustration of a bottom view of a grooming device of the present invention using a partial sleeve member.

Still with reference to FIG. 2, the inner surface 32 of the sleeve 22 is in fitted contact with a plurality of tines 20. Also preferably, the thickness of the sleeve 22, as measured by the distance between the inner surface 32 of the sleeve 22 and the outer surface 34 of the sleeve 22, is preferably selected to permit the spacing of the tines 20 to remain substantially unchanged after fitting of the sleeve 22 to the tines 20. The sleeve 22 may be made from any conventional material capable of being in fitted contact with at least a portion of at least one tine 20 of the grooming device. The sleeve may encase a single tine 20 (FIG. 5b) or a plurality of tines 20 (FIG. 2a). Alternatively, the sleeve may be a partial sleeve 22 as seen in FIG. 3. Partial sleeves 22 may encase and rotate around a single tine 20, or may contact only a portion of a single tine, being in hinged fitted contact through a force fitting, glue, clamp, hinge or flexible casting or molding (FIG. 3). A further feature of this aspect of the invention is a removable sleeve 22. One specific embodiment of the present invention may include a removable partial sleeve which may be clamped to a portion of the tines at opposing ends of the plurality of tines.

Although the sleeve 22 may be made from any conventional material capable of being in fitted contact with at least a portion of at least one tine 20 of the grooming device, preferably the sleeve 22 material has a naturally textured surface such as elastomeric materials like natural or synthetic rubbers and plastics. Other textured materials such as leathers or fabrics with naps may also be used. Materials with slick surface finishes such as metals and hard plastics should be roughened or textured to provide sufficient friction to gently tug loose hair from the animal's fur. Sleeve materials suitable for the present invention should have a dry coefficient of friction of about 0.5 to about 1.0, preferably of about 0.6 to about 0.9, or more preferably of about 0.7 to about 0.8. The dry coefficient of friction may be a natural property of the material, or as previously described the selected material may be roughened or artificially textured to provide the proper coefficient of dry friction. The sleeve 22 may also include elastomeric coatings. These coatings may be applied to the grooming device by dipping, spraying, or other methods known to those skilled in the art.

Figure 5:
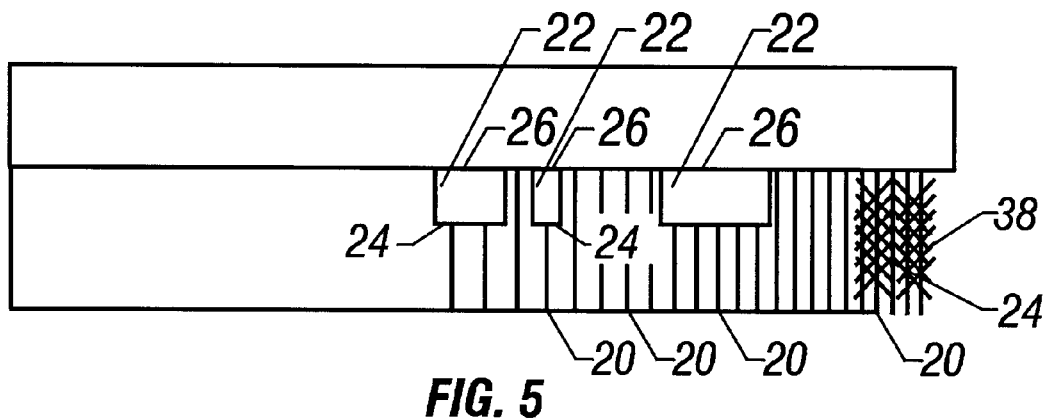
FIG. 5 is a schematic illustration of several types of sleeves that may be used as a part of the grooming device of the present invention.

As previously described, multiple sleeves 22 may be used to vary the coverage of the combing area. For purposes of this invention, the combing area is the area outlined by the plurality of tines 20. For example, for a plurality of tines 20 that outline a rectangle (FIG. 2), the combing area would be calculated by multiplying the width of the plurality of tines 20 by the length of the tines 20 from their tips 18 to the leading edge 16 by a factor of two (2). Combing areas defined by other tine 20 configurations, e.g., saw toothed or square wave configurations, would similarly be calculated by methods known to those skilled in the art. Multiple sleeves 22 may be in fitted contact with at least a portion of at least one tine 20 in a perpendicular arrangement to the leading edge 16 of the base 12 (FIG. 5). Alternatively, additional sleeves 22 may be in fitted contact with at least a portion of at least one tine 20 in a parallel arrangement to the leading edge 24 of the sleeve 22 which is proximate to the base 12 as indicated by phantom line and shaded area illustrated in FIG. 2. Broadly, the grooming device may use at least one sleeve 22 or multiple sleeves 22 to cover from about 5% to about 75% of the combing surface area. Preferably, at least one sleeve 22 or multiple sleeves 22 cover from about 20% to about 65% of the combing surface area. More preferably, at least one sleeve 22 or multiple sleeves 22 cover from about 30% to about 50% of the combing surface area.

Figure 5A:
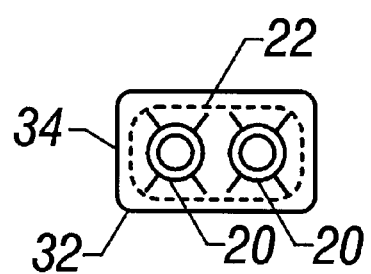
FIG. 5a is a schematic illustration of a sleeve covering two tines using a glove configuration as a part of the grooming device of the present invention.
Figure 5B:
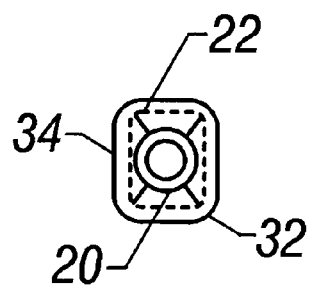
FIG. 5b is a schematic illustration of a sleeve covering one tine using a glove configuration as a part of the grooming device of the present invention.
Figure 5C:
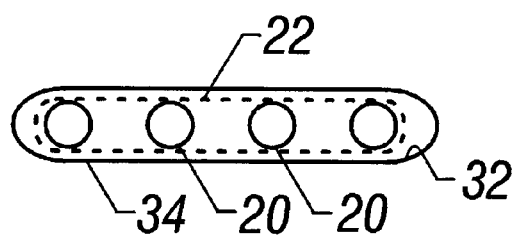
FIG. 5c is a schematic illustration of a sleeve which covers four tines using a mitten configuration as a part of the grooming device of the present invention.

Particular embodiments of the sleeve 22 of the present invention may function as an open cap or casing through which one tine 20 (FIGS. 5b, 5d) or multiple tines 20 (FIGS. 5a, 5c) may be inserted. Additionally, the sleeves 22 may be of a glove configuration wherein the sleeve material surrounds or encases individual tines 20 (FIGS. 5a, 5b). The sleeves 22 may optionally be in a mitten configuration wherein the sleeve material surrounds or encases more than one tine 20 (FIGS. 2, 2a, 3, and 5c).

Figure 5D:
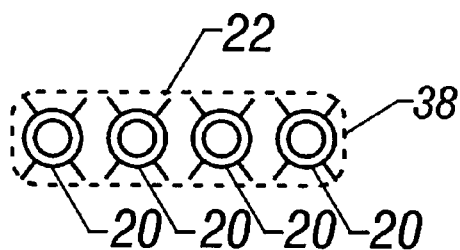
FIG. 5d is a schematic illustration of four sleeves covering individual tines with bristles as a part of the grooming device of the present invention.

The present invention also provides for a grooming device that combines combing and brushing features. For example, FIGS. 5 and 5d illustrate use of a sleeve 22 with a plurality of bristles. The combing area covered by the sleeve 22 may be varied to provide a grooming device which functions predominantly as a comb, e.g., where the sleeve 22 with bristles covers a relatively small percentage of the combing area. Alternatively, a relatively large amount of the combing area may be covered by a sleeve 22 or multiple sleeves 22 with bristles to provide a grooming device that functions primarily as a brush. A further feature of the present invention would be to provide removable sleeves 22 in order for the function of the grooming device to be switched alternately from comb to brush.

The grooming device of the present invention may include a sleeve 22 which is in planar alignment with the tines 20. The sleeve 22 or sleeves 22 may be aligned in a plane substantially parallel to the plane formed by the tines 20 (FIGS. 2, 2a, 3). Optionally, the sleeve 22 may be a web configuration with the sleeve aligned in a plane defined by the tines 20 (not shown). Sleeve 22 configurations, particularity sleeves 22 fitted to single tines 20, may be made to conform to tine 20 configurations that are curved or otherwise non-planar (not shown). Such sleeves 22 fitted to single tines 20 are preferable for use with grooming devices with a flexible base 12.

Figure 4:
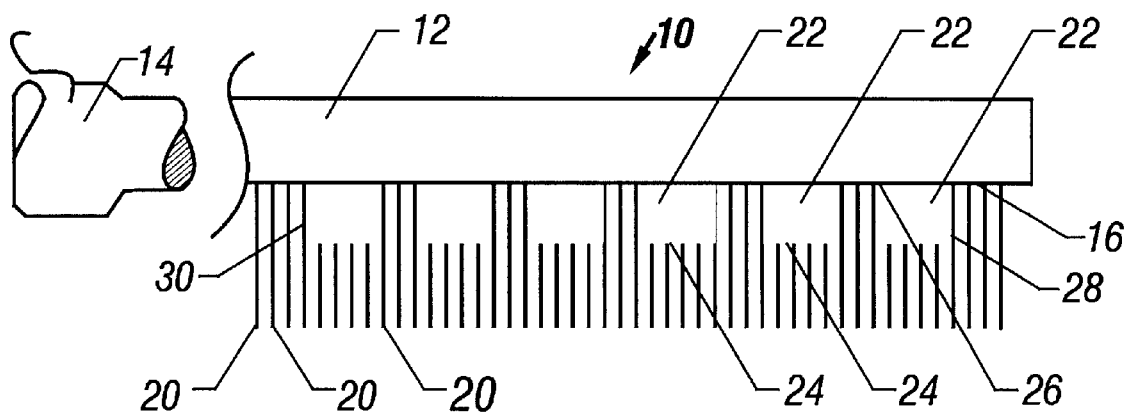
FIG. 4 is a schematic illustration of another embodiment of the grooming device of the present invention.
Figure 4A:
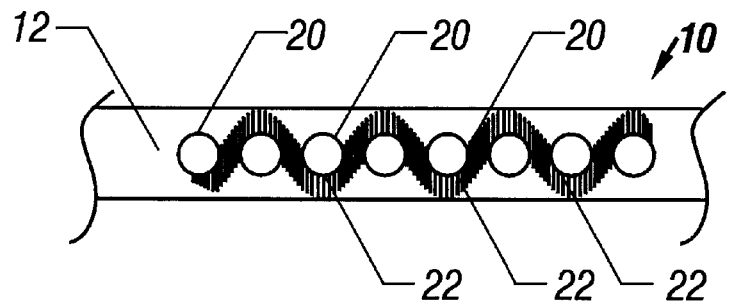
FIG. 4a is a schematic illustration of a bottom view of another embodiment of the grooming device of the present invention.

One embodiment of the present invention may include a sleeve 22 which is woven serpentine between the plurality of tines 20 (FIG. 4a). Optionally, multiple sleeves 22 be woven between the plurality of tines 20 using the same weaving pattern as the sleeve 22 proximate to the base 12. Still other embodiments of the present invention may include multiple sleeves 22 with a basket weaving pattern, a random weaving pattern, or an arrangement of woven and non-woven sleeves 22.

A method for grooming a fur-bearing animal may include the steps of: guiding a body having an integral base with a leading edge having a plurality of spaced apart tines attached thereon through the animal's hair; stroking the animal's hair with the plurality of spaced apart tines; passing the animal's hair through the plurality of spaced apart tines; removing hair from the fur-bearing animal with the plurality of spaced apart tines, the leading edge of the integral base and the leading edge of the at least one sleeve; and retaining at least some of the hair removed from the animal at the leading edge of the at least one sleeve. Optionally, at least some of the hair removed from the animal may be retained at the leading edge of the coating where a coating has been substituted for a sleeve or sleeves. The method may also include the additional steps of gently lifting the grooming device and rolling it outward, away from the animal's skin. The rolling motion generally promotes longer contact of the leading edge of the coating with the animal's hair. Thus, more hair may be removed and retained in each stroke.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A grooming device for use on fur-bearing animals comprising:
   (a) a body having an integral base with a leading edge having a plurality of spaced apart tines attached thereon;
   (b) at least one sleeve proximate to the base contacting a portion of at least one of the plurality of tines;
   (c) said at least one of the plurality of tines engagedly surrounded by said at least one sleeve for securely attaching said sleeve to the grooming device; and
   (d) said at least one sleeve is made of an elastomeric material.

2. The grooming device of claim 1 wherein said at least one sleeve has a leading edge for removal and retention of hair from the fur-bearing animal.

3. The grooming device of claim 1 wherein said elastomeric material is a natural rubber.

4. The grooming device of claim 1 wherein said elastomeric material is a synthetic rubber.

5. The grooming device of claim 1 wherein said elastomeric material is a plastic.

6. A grooming device for use on fur-bearing animals comprising:
   (a) a body having an integral base with a leading edge having a plurality of spaced apart tines attached thereon;
   (b) at least one sleeve proximate to the base contacting a portion of at least one of the plurality of tines;
   (c) said at least one of the plurality of tines engagedly surrounded by said at least one sleeve for securely attaching said sleeve to the grooming device; and
   (d) said at least one sleeve is made of a textured material having a dry coefficient of friction of about 0.5 to about 1.0.

7. The grooming device of claim 6 wherein said at least one sleeve has a leading edge for removal and retention of hair from the fur-bearing animal.

8. The grooming device of claim 6 wherein said textured material is leather.

9. The grooming device of claim 6 wherein said textured material is a napped fabric.

10. A grooming device for use on fur-bearing animals comprising:
  (a) a body having an integral base with a leading edge having a plurality of spaced apart tines attached thereon;
  (b) at least one sleeve proximate to the base contacting a portion of at least one of the plurality of tines;
  (c) said at least one of the plurality of tines engagedly surrounded by said at least one sleeve for securely attaching said sleeve to the grooming device; and
  (d) said at least one sleeve is woven between the tines.

11. The grooming device of claim 10 wherein said at least one sleeve has a leading edge for removal and retention of hair from the fur-bearing animal.

12. A grooming device for use on fur-bearing animals comprising:
  (a) a body having an integral base with a leading edge having a plurality of spaced apart tines attached thereon;
  (b) at least one sleeve proximate to the base contacting a portion of at least one of the plurality of tines;
  (c) said at least one of the plurality of tines engagedly surrounded by said at least one sleeve for securely attaching said sleeve to the grooming device; and
  (d) said at least one sleeve is made of an elastomeric coating.

13. The grooming device of claim 12 wherein said at least one sleeve has a leading edge for removal and retention of hair from the fur-bearing animal.

* * * * *